United States Patent [19]

Nourshargh et al.

[11] Patent Number: 5,175,778
[45] Date of Patent: Dec. 29, 1992

[54] INTEGRATED OPTIC WAVEGUIDE COUPLER WITH REDUCED WAVELENGTH SENSITIVITY

[75] Inventors: Noorallah Nourshargh, London; Simon P. Shipley, Buckinghamshire, both of England

[73] Assignee: Gec-Marconi Limited, England

[21] Appl. No.: 745,472

[22] Filed: Aug. 15, 1991

[30] Foreign Application Priority Data

Aug. 22, 1990 [GB] United Kingdom ............... 9018384

[51] Int. Cl.$^5$ .............................................. G02B 6/26
[52] U.S. Cl. ...................................... 385/42; 385/50; 385/27
[58] Field of Search ............... 350/96.11, 96.12, 96.15; 385/42, 50, 14, 15, 27

[56] References Cited

U.S. PATENT DOCUMENTS

| 4,431,260 | 2/1984 | Palmer | 350/96.15 |
| 4,859,018 | 8/1989 | O'Sullivan et al. | 350/96.15 X |
| 4,998,793 | 3/1991 | Henry et al. | 350/96.15 |

Primary Examiner—John D. Lee
Assistant Examiner—S. W. Barns
Attorney, Agent, or Firm—Kirschstein, Ottinger, Israel & Schiffmiller

[57] ABSTRACT

An integrated optic waveguide coupler having an interaction length throughout which two waveguides lie parallel and in contact with each other, in which the interaction length incorporates at least one straight section and, adjoining the straight section, there is provided at least one additional interaction length having a predetermined curvature. The curvature and the length of the interaction length together minimize wavelength sensitivity.

6 Claims, 3 Drawing Sheets

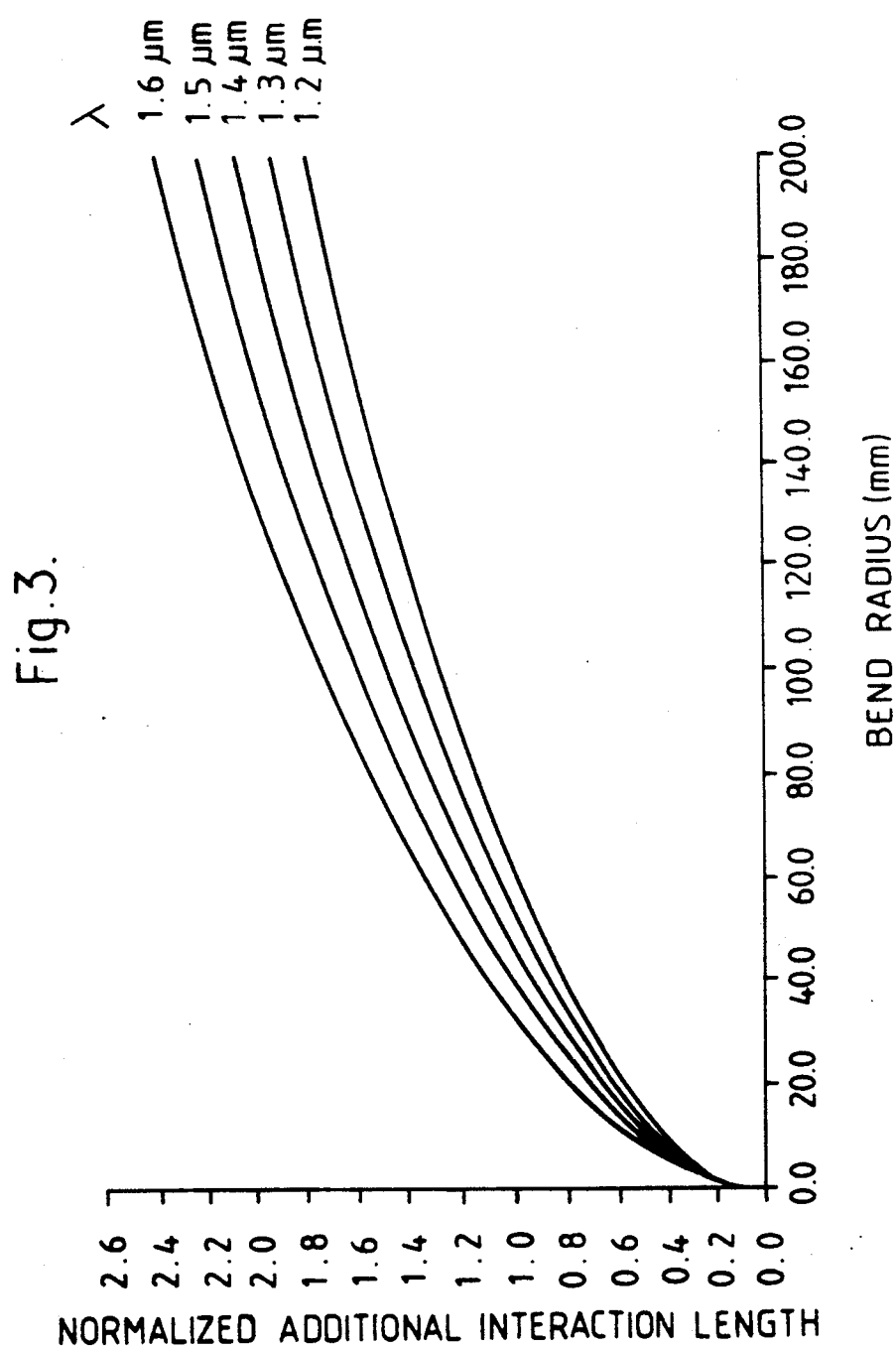

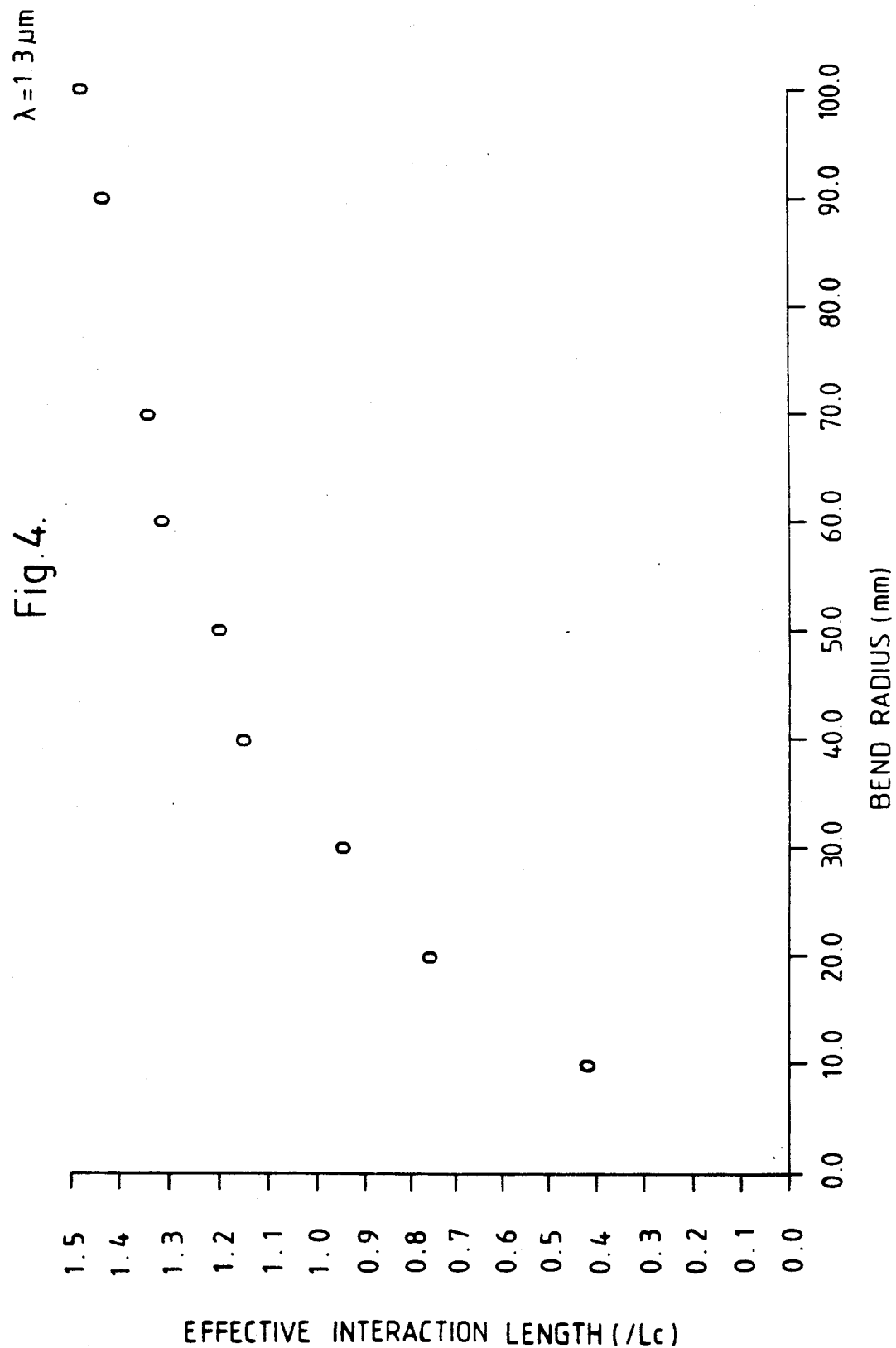

INTEGRATED OPTIC WAVEGUIDE COUPLER WITH REDUCED WAVELENGTH SENSITIVITY

BACKGROUND OF THE INVENTION

This invention relates to integrated optic waveguide couplers, i.e. those in which power in one waveguide is coupled to an identical adjacent waveguide over an interaction length throughout which the waveguides lie parallel and are in contact with each other, the degree of coupling depending upon the interaction length and varying for different wavelengths. Some power transfer will also take place between waveguides which are sufficiently closely spaced, but not necessarily in contact, this also being a function of wavelength and also on the degree of separation. Accordingly power transfer in the interaction length will be supplemented to some extent by closely spaced regions of waveguides adjoining the interaction length, and which will hereinafter be called the additional interaction length.

The minimum length over which coupling takes place for full transfer of power at a given wavelength is known generally as the coupling length.

Now it can be shown that the amount of power transfer for a given wavelength depends also on the curvature of contacting or closely spaced waveguide sections, and this characteristic is made use of in the present invention. The invention is particularly useful in passive star couplers, for example $2 \times N$ or $N \times N$ star couplers, in which power from each input waveguide is distributed equally among N output waveguides. Such star couplers are useful in optical communications networks.

It is advantageous in optical communications networks which involve optical signals of two or more different wavelengths for the star couplers to be wavelength insensitive over the range of wavelengths for which the network is designed.

SUMMARY OF THE INVENTION

According, therefore, to the invention in an integrated optic waveguide directional coupler comprising two identical waveguides having an interaction length throughout which the waveguides lie parallel and are in contact with each other, said interaction length incorporates at least one straight section and, adjoining the straight section of the interaction length, there is provided at least one additional interaction length having a predetermined curvature.

Thus although it has not previously been possible to achieve wavelength insensitivity to any satisfactory degree in integrated optic waveguide couplers formed from similar waveguides, it has now been found that, by appropriately selecting the lengths of the interaction length and of the additional interaction length, together with the bend radius of the latter, it is possible to obtain a reasonable degree of wavelength insensitivity.

BRIEF DESCRIPTION OF THE DRAWINGS

The invention will be further explained with reference to FIGS. 1 to 4 of the accompanying drawings, in which FIG. 3 shows theoretically how power transfer is affected by the curvature of waveguide sections for different wavelengths, and FIG. 4 represents experimental confirmation of the variation in power transfer with varying waveguide curvature for a given wavelength 1.3 μm.

DETAILED DESCRIPTION OF THE PREFERRED EMBODIMENTS

Figure 1:
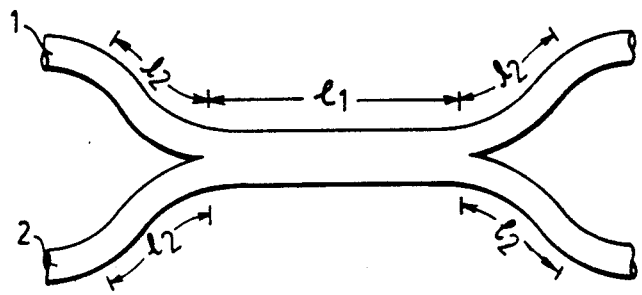
FIG. 1 illustrates diagrammatically and not to scale a form of coupling in accordance with the invention.

Referring first to FIG. 1, this shows a pair of optical waveguides 1, 2, formed by deposition of waveguide material on a suitable substrate, in accordance with a known technique, the waveguides having an interaction length 1 in which they lie parallel to each other, and in contact, to provide coupling between them. In accordance with the invention the interaction length includes a straight section $l_1$ and, at each end, the waveguide curve away from each other to provide curved sections $l_2$ having a predetermined curvature, the lengths of the sections and the degree of curvature being chosen to provide a degree of wavelength insensitivity for certain transmitted wavelengths as will subsequently be described.

As mentioned above coupling of light occurs between two parallel optical waveguides in close proximity to one another. If all the optical power is initially in the guided mode of the first waveguide then the power in the waveguides, as a function of length is given by, $$P_1(Z) = P_1(0)\cos^2 \frac{\pi L}{2L_c} \qquad \text{1a}$$

$$P_2(Z) = P_1(0) - P_1(Z) = P_1(0)\sin^2 \frac{(\pi L)}{(2L_c)} \qquad \text{1b}$$

where
Z is the direction of propagation
$P_1$ is the power in guide 1
$P_2$ is the power in guide 2
$L_c$ is the coupling length.

However, as mentioned above, $L_c$ is a function of both wavelength, λ, and waveguide separation, S, therefore the splitting ratio of any waveguide directional coupler, (usually $P_2(Z)/[P_1(Z)+P_2(Z)]$) will vary with wavelength. The intention here is to minimise this variation in a simple manner.

In waveguides having an 8 μm square core with a core/cladding refractive index difference of 0.004, it has been found that the coupling length may be approximated by $$L_c = \exp^-(+0.27s\lambda - 0.68s + 0.31\lambda - 00.06)mm \qquad 2$$

Obviously the wavelength sensitivity is minimised when;

$$\frac{1}{L_c} \frac{dL_c}{d\lambda} = -[0.27s + 0.31] = 0 \qquad 3$$

Figure 2:
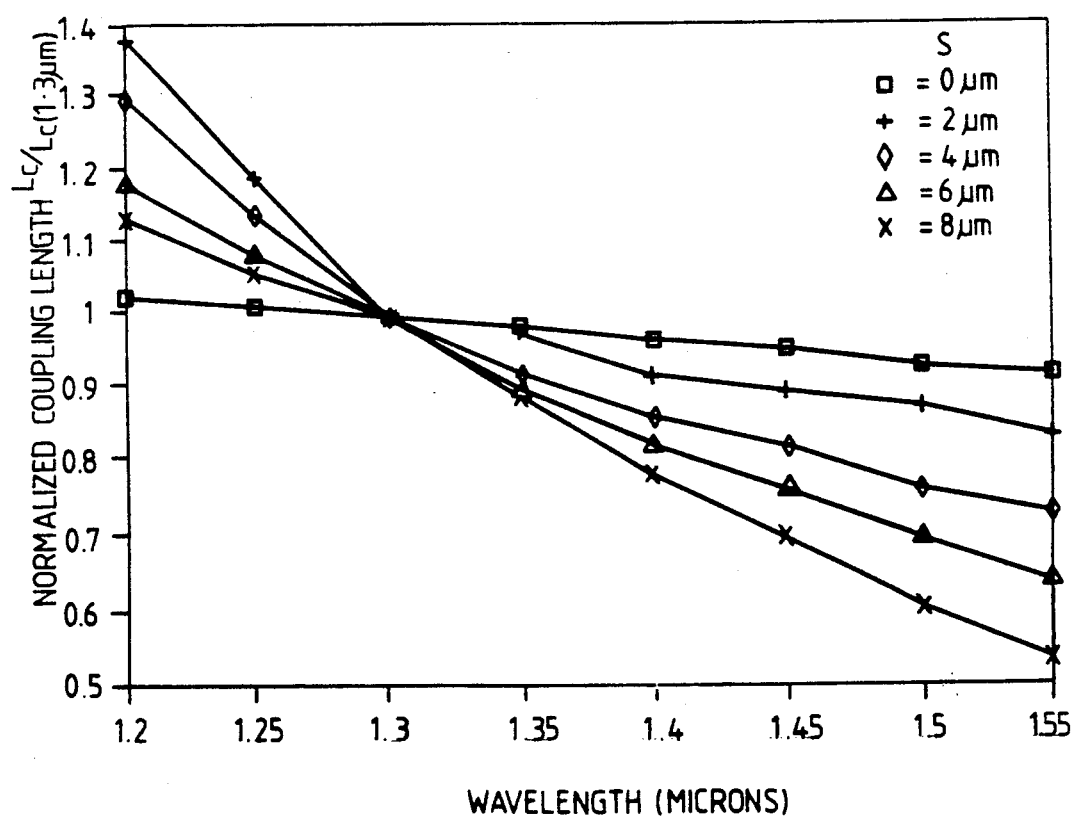
FIG. 2 illustrates how the coupling length varies with wavelength for a number of different waveguide separations.

Restricting s to non negative values implies that the least wavelength sensitive devices are achieved for s=0 as shown in FIG. 2, in which the normalised coupling length ($L_c/L_{c(1.3 \mu m)}$) is plotted against wavelength in microns for different waveguide separations S.

Any device of practical use will necessarily have inputs and outputs separated by at least tens of microns, and so curved waveguide sections will be needed between the inputs and outputs and the interaction region over which the waveguides are in contact (s=0). As the curved waveguides are in close proximity over at least some of their length a certain degree of coupling will occur between them in those regions. The magnitude of this coupling may be estimated by assuming that the curved waveguide pairs comprise an infinite number of infinitely short parallel waveguide pairs of varying separation. That is in effect combining equations 1b and 2 to get $$P_2(Z_{final}) = P_1(0)\sin^2\left\{\frac{\pi}{2}\int_{Z_{initial}}^{Z_{final}}\frac{Z}{L_c(s)}dz\right\} \quad 4$$

where s is a function of Z.

Equation 4 has been evaluated numerically [FIG. 3] and verified experimentally [FIG. 4], for the case in which the curved waveguide sections are arcs of circles (s-bends) over a range of bend radii.

The results are expressed in terms of normalised additional interaction length and do not include any contribution from parallel contacting waveguides between the input and output curves. The closest separation of the current guides is 0 μm.

A comparison of FIGS. 2 and 3 shows, particularly for large radius bends, the majority of the wavelength variation occurs in the curved sections, and also that the most desirable value of interaction length for a 50% coupler, half the coupling length, cannot be achieved using any combination of straight interaction region and bends unless the bend radius is less than about 5 mm, which is not desirable, as the minimum bend radius is ordinarily restricted by the rapid increase of bend induced loss with reducing bend radius. This varies with the particular design of the waveguide, but for the guides described earlier the minimum radius is approximately 20-25 mm.

To produce a 50% coupler it is therefore necessary to choose a combination of curved and straight waveguides such that the total interaction length is 1½ coupling lengths. The least wavelength sensitive device will be achieved if the minimum acceptable bend radius is used for the curved sections, with any additional interaction length needed to make the 1½ coupling lengths coming from a straight parallel waveguide pair (of separation 0 μm).

EXAMPLE

If a 50% coupler was required, and the minimum acceptable bend radius was 25 mm, the curved sections would contribute (from FIG. 3). 0.73 coupling lengths at a wavelength of 1.5 μm and 0.6 coupling lengths at a wavelength of 1.3 μm.

The required 50% split ratio (1.5 coupling lengths) cannot be achieved for both wavelengths simultaneously (due to the residual wavelength sensitivity); however by including a straight parallel waveguide section of approximately 580 μm length (0.82 coupling lengths at 1.3 μm, 0.86 coupling lengths at 1.5 μm) it is possible to have a device with 1.42 coupling lengths at 1.3 μm and 1.59 coupling lengths at 1.5 μm. This is equivalent to a splitting ratio of 63% at 1.3 μm and 35% at 1.5 μm.

The waveguides are conveniently fabricated from plasma-deposited silica and silica/germania, and diverge from each other at the end of the interaction section. However all conventional integrated optic materials are equally applicable, such as lithium niobate, silicon nitride and oxynitride, III-V waveguide materials, ion exchange glass waveguide materials and polymer waveguide materials.

A 2×N star coupler may be formed on the same substrate by linking in a cascade a plurality of 2×2 couplers, as is well known. In general, an M×N star coupler could be formed from a plurality of 2×2 couplers, where M is two or more.

Waveguide directional couplers in accordance with the invention are typically useful in broadband communications networks where it is desirable fully to utilise the available optical fibre bandwidth.

Two examples are the broadband passive optical network and the multichannel star network.

In a broadband passive optical network, a large number of television signals (up to 30) each at a different wavelength are combined into a single optical fibre in which they are carried at a wavelength within about 100 nm of 1.5 μm. A second optical fibre carries two-way voice communications, i.e. telephony, at a wavelength of 1.3 μm. Both sources of signals arrive at a distribution point consisting of a 2×N passive splitter embodying the invention. Light from both of two inputs is divided equally among the N outputs, so that it is desirable for the passive splitter device to operate as independently of wavelength as practicable over the range 1.2-1.5 μm. The signals are then carried on individual optical fibres either to a further distribution point or to a subscriber.

In a multichannel star network, each node on a network of N nodes is connected by a central hub to a receive and a transmit optical fibre. The central hub consists of an N×N transmissive star coupler. Each node is allocated a unique transmit wavelength, usually in the range 1.2 to 1.5 μm, and is capable of receiving and differentiating between all N signal wavelengths (those of the N-1 other nodes and itself). In order to simplify system design, and in particular to reduce the receiver dynamic range requirement, it is desirable to minimise the variations in received power levels with different wavelengths.

Couplers in accordance with the invention are therefore particularly suitable for use in both the above types of networks.

We claim:

1. An integrated optic waveguide directional coupler with reduced sensitivity to a range of wavelengths, comprising: two identical waveguides having an interaction length throughout which the waveguides lie parallel and are in contact with each other, said interaction length incorporating at least one straight section and, adjoining the straight section, at least one curved section having a predetermined degree of curvature, each section having a length dimension related to said degree of curvature to reduce wavelength sensitivity in said range.

2. An integrated optic waveguide directional coupler according to claim 1 wherein the curvature has a bend radius of approximately 20 to 25 mm.

3. An integrated optic waveguide directional coupler according to claim 1 wherein the interaction length is approximately 1½ coupling lengths.

4. An integrated optic waveguide directional coupler according to claim 1 wherein the range of wavelengths lies between 1.3 μm and 1.5 μm.

5. An integrated optic waveguide directional coupler according to claim 1 wherein the curved section has a radius of 22 mm, providing 0.73 coupling lengths at a wavelength of 1.5 μm and 0.6 coupling lengths at a wavelength of 1.3 μm, and wherein the length dimension of the straight section provides 0.82 coupling lengths at a wavelength of 1.3 μm and 1.59 coupling lengths at a wavelength of 1.5 μm.

6. An integrated optic device comprising a single substrate having deposited thereon a plurality of interconnected directional couplers with reduced sensitivity to a range of wavelengths, each coupler comprising: two identical waveguides having an interaction length throughout which the waveguides lie parallel and are in contact with each other, said interaction length incorporating at least one straight section and, adjoining the straight section, at least one curved section having a predetermined degree of curvature, each section having a length dimension related to said degree of curvature to reduce wavelength sensitivity in said range.

* * * * *